(12) United States Patent
Partridge et al.

(10) Patent No.: US 8,580,111 B2
(45) Date of Patent: Nov. 12, 2013

(54) DEVICE FOR SEPARATING FUEL COMPONENTS

(75) Inventors: Randall D. Partridge, Califon, NJ (US); George Walchuk, Annadale, NJ (US); Kouseki Sugiyama, Numazu (JP)

(73) Assignees: Toyota Jidosha Kabushiki Kaisha, Toyota-shi (JP); Exxon Mobil Research and Engineering Company, Annandale, NJ (US)

( * ) Notice: Subject to any disclaimer, the term of this patent is extended or adjusted under 35 U.S.C. 154(b) by 248 days.

(21) Appl. No.: 12/955,298

(22) Filed: Nov. 29, 2010

(65) Prior Publication Data

US 2012/0132576 A1      May 31, 2012

(51) Int. Cl.
*B01D 61/36* (2006.01)
*C10G 31/09* (2006.01)

(52) U.S. Cl.
USPC ..... 210/172.1; 210/149; 210/181; 210/321.6; 210/416.4; 210/634; 210/640; 210/651; 123/3; 123/304; 123/445; 123/515; 123/540; 123/543; 123/553; 123/575; 123/577; 137/571; 585/818; 585/819; 60/285; 701/103; 701/104

(58) Field of Classification Search
None
See application file for complete search history.

(56) References Cited

U.S. PATENT DOCUMENTS

| | | | |
|---|---|---|---|
| 6,622,663 B2 * | 9/2003 | Weissman et al. | 123/1 A |
| 6,711,893 B2 * | 3/2004 | Ueda et al. | 60/285 |
| 6,972,093 B2 * | 12/2005 | Partridge et al. | 210/321.6 |
| 7,013,844 B2 * | 3/2006 | Oda | 123/3 |
| 7,077,105 B2 * | 7/2006 | Oda et al. | 123/406.3 |
| 7,107,942 B2 * | 9/2006 | Weissman et al. | 123/1 A |
| 7,429,322 B2 * | 9/2008 | Fujita et al. | 210/172.4 |
| 7,478,628 B2 * | 1/2009 | Hines | 123/557 |
| 7,563,358 B2 * | 7/2009 | Stavens et al. | 208/138 |
| 7,638,674 B2 * | 12/2009 | Rice et al. | 585/738 |
| 7,708,151 B2 * | 5/2010 | Peiffer et al. | 210/500.39 |
| 7,803,275 B2 * | 9/2010 | Partridge et al. | 210/640 |
| 7,842,124 B2 * | 11/2010 | Partridge et al. | 95/50 |
| 8,038,872 B2 * | 10/2011 | Jokschas et al. | 210/86 |
| 8,051,828 B2 * | 11/2011 | Sengupta et al. | 123/304 |
| 8,173,013 B2 * | 5/2012 | Sato et al. | 210/172.4 |
| 8,211,300 B2 * | 7/2012 | Partridge et al. | 210/181 |
| 8,231,779 B2 * | 7/2012 | Jokschas et al. | 210/86 |
| 8,257,583 B2 * | 9/2012 | Partridge et al. | 210/149 |
| 8,372,278 B1 * | 2/2013 | Nguyen et al. | 210/172.2 |
| 8,470,168 B2 * | 6/2013 | Brun | 210/130 |
| 2002/0139111 A1 * | 10/2002 | Ueda et al. | 60/285 |
| 2002/0139321 A1 * | 10/2002 | Weissman et al. | 123/1 A |

(Continued)

FOREIGN PATENT DOCUMENTS

| | | | |
|---|---|---|---|
| JP | 2004232624 A | | 8/2004 |
| JP | 2005140047 A | * | 6/2005 |
| JP | 2007278298 A | * | 10/2007 |
| JP | 2008095666 A | | 4/2008 |

*Primary Examiner* — Robert James Popovics
(74) *Attorney, Agent, or Firm* — Gifford, Krass, Sprinkle, Anderson & Citkowski, P.C.

(57) ABSTRACT

A device for separating fuel components comprising a separating membrane for separating high-octane fuel components from un-separated fuel and a heat exchanger between first liquid passing through the heat exchanger and second liquid passing through the heat exchanger, is provided. The first liquid is un-separated fuel passing through the heat exchanger before being supplied to the separating membrane. The second liquid is low-octane fuel remaining when the high-octane fuel components are separated from the un-separated fuel, passing through the heat exchanger after changing to an almost liquid phase.

5 Claims, 1 Drawing Sheet

(56) References Cited

U.S. PATENT DOCUMENTS

| | | | |
|---|---|---|---|
| 2004/0149644 A1* | 8/2004 | Partridge et al. | 210/321.6 |
| 2005/0056264 A1* | 3/2005 | Weissman et al. | 123/577 |
| 2005/0103285 A1* | 5/2005 | Oda | 123/3 |
| 2006/0037589 A1* | 2/2006 | Gupta et al. | 123/557 |
| 2006/0118085 A1* | 6/2006 | Oda et al. | 123/406.3 |
| 2006/0201884 A1* | 9/2006 | Kulprathipanja et al. | 210/651 |
| 2008/0006333 A1* | 1/2008 | Partridge et al. | 137/571 |
| 2008/0011680 A1* | 1/2008 | Partridge et al. | 210/640 |
| 2008/0035557 A1* | 2/2008 | Partridge et al. | 210/500.23 |
| 2008/0035573 A1* | 2/2008 | Peiffer et al. | 210/651 |
| 2008/0035575 A1* | 2/2008 | Partridge et al. | 210/651 |
| 2008/0053416 A1* | 3/2008 | Hines | 123/557 |
| 2009/0165759 A1* | 7/2009 | Sengupta et al. | 123/575 |
| 2009/0242038 A1* | 10/2009 | Sengupta et al. | 137/93 |
| 2010/0062186 A1* | 3/2010 | Peiffer et al. | 427/601 |
| 2010/0154394 A1* | 6/2010 | Partridge et al. | 60/298 |
| 2010/0155315 A1* | 6/2010 | Partridge et al. | 210/149 |
| 2010/0155322 A1* | 6/2010 | Partridge et al. | 210/321.6 |
| 2012/0132576 A1* | 5/2012 | Partridge et al. | 210/175 |
| 2012/0132577 A1* | 5/2012 | Partridge et al. | 210/180 |
| 2012/0270958 A1* | 10/2012 | Shaffer et al. | 521/27 |
| 2013/0036990 A1* | 2/2013 | Chishima et al. | 123/3 |
| 2013/0133249 A1* | 5/2013 | Drury et al. | 44/639 |
| 2013/0160745 A1* | 6/2013 | Kawaguchi et al. | 123/515 |
| 2013/0168311 A1* | 7/2013 | Johnson et al. | 210/450 |
| 2013/0174808 A1* | 7/2013 | KUDO et al. | 123/445 |

* cited by examiner

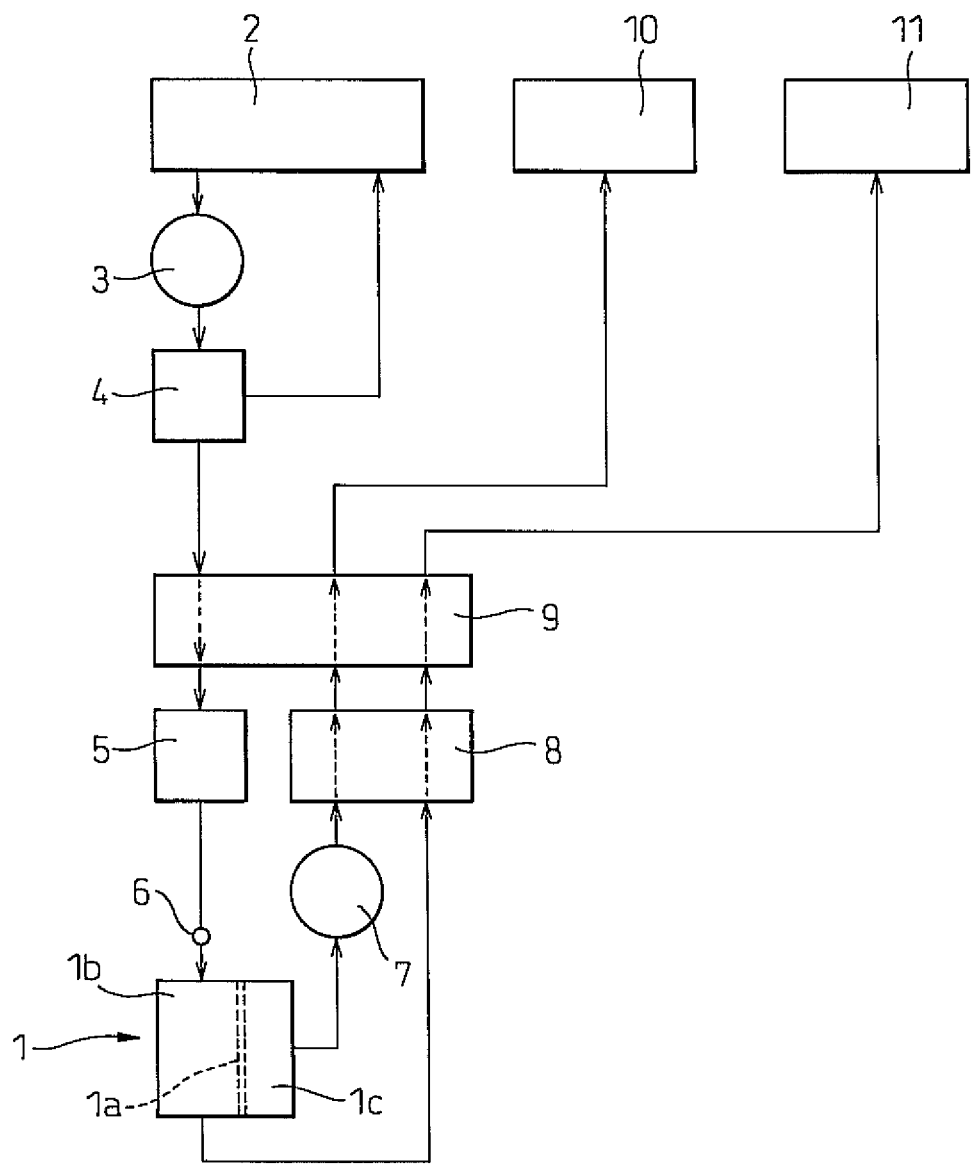

DEVICE FOR SEPARATING FUEL COMPONENTS

BACKGROUND OF THE INVENTION

1. Field of the Invention

The present invention relates to a device for separating fuel components.

2. Description of the Related Art

For example, in an engine having a high compression ratio, high-octane fuel is needed to restrain knocking. However, in low engine load operations in which knocking rarely occurs, the engine may not be required to use high-octane fuel, but low-octane fuel. Accordingly, it is suggested that the engine not use high-octane fuel (high-octane gasoline) which is expensive, but regular gasoline which is separated into high-octane fuel components and the remaining fuel as low-octane fuel by a device for separating fuel components.

The device for separating fuel components separates aromatic components as high-octane fuel components from fuel by means of a separating membrane and makes the remaining fuel low-octane fuel. In such a device for separating fuel components, un-separated fuel is preferably heated to improve a separating ability of the separating membrane. Therefore, the low-octane fuel remaining when high-octane fuel components are separated from fuel is maintained at a high temperature and may be required to be cooled down before being stored in a low-octane fuel tank. Accordingly, it is suggested that a heat exchanger between the un-separated fuel and the separated low-octane fuel be provided and the separated low-octane fuel be cooled down by the heat exchanger (for example, refer to Japanese Unexamined Patent Publication Nos. 2004-232624 and 2008-095666).

However, a part of the low-octane fuel remaining when high-octane fuel components are separated changes from a liquid phase to a gas phase because the un-separated fuel is heated. Thus, a flow resistance of the low-octane fuel in the heat exchanger is large and a heat transfer coefficient of gas phase is smaller than that of a liquid phase. Therefore, to sufficiently cool down the low-octane fuel including the gas phase, a very large heat exchanger is required, and it is thus difficult for the device for separating fuel components with such a very large heat exchanger to be mounted on a vehicle.

SUMMARY OF THE INVENTION

Therefore, an object of the present invention is to provide a device for separating fuel components, which can sufficiently cool down the low-octane fuel remaining when high-octane fuel components are separated by means of the separating membrane without a large heat exchanger.

A first device for separating fuel components according to the present invention is characterized in that the first device comprises a separating membrane for separating high-octane fuel components from un-separated fuel and a heat exchanger between first liquid passing through the heat exchanger and second liquid passing through the heat exchanger, wherein the first liquid is un-separated fuel passing through the heat exchanger before being supplied to the separating membrane, and the second liquid is low-octane fuel remaining when the high-octane fuel components are separated from the un-separated fuel, passing through the heat exchanger after changing to an almost liquid phase.

A second device for separating fuel components according to the present invention is characterized in that according to the first device, an air cooling apparatus for cooling down the low-octane fuel is provided to change a gas phase part of the low-octane fuel to an almost liquid phase.

A third device for separating fuel components according to the present invention is characterized in that according to the second device, in a low vehicle speed condition when a speed of the vehicle on which the third device is mounted is lower than a predetermined speed, the un-separated fuel at a set flow rate larger than a set flow rate in an engine idle condition is supplied to the separating membrane to separate high-octane fuel components, and the air cooling apparatus has a cooling ability which can change a gas phase part of the low-octane fuel remaining when the high-octane fuel components are separated from the un-separated fuel at both the set flow rates in the low vehicle speed condition and in the engine idle condition to an almost liquid phase.

According to the first device for separating fuel components of the present invention, the first device comprises the separating membrane for separating high-octane fuel components from un-separated fuel and the heat exchanger between first liquid passing through the heat exchanger and second liquid passing through the heat exchanger. The first liquid is the un-separated fuel passing through the heat exchanger before being supplied to the separating membrane, and the second liquid is low-octane fuel remaining when the high-octane fuel components are separated from the un-separated fuel, passing through the heat exchanger after changing to an almost liquid phase. Such a heat exchanger between the first liquid and the second liquid has a sufficient high heat exchange efficiency to cool down the low octane fuel passing through the heat exchanger as the second liquid even when the heat exchanger is small so as to be easily mounted on the vehicle. To use such a heat exchanger, a gas phase part of the low-octane fuel is changed to an almost liquid phase with pressurization or cooling down and thereafter is made to pass through the heat exchanger.

According to the second device for separating fuel components of the present invention, in the first device, an air cooling apparatus for cooling down is provided to change a gas phase part of the low-octane fuel to an almost liquid phase. Accordingly, with the air cooling apparatus, the low-octane fuel can be made to pass through the heat exchanger as the second liquid.

According to the third device for separating fuel components of the present invention, in the second device, in a low vehicle speed condition when a speed of the vehicle on which the third device is mounted is lower than a predetermined speed, the un-separated fuel at the set flow rate larger than the set flow rate in the engine idle condition is supplied to the separating membrane to separate high-octane fuel components, and the air cooling apparatus has the cooling ability which can change a gas phase part of the low-octane fuel remaining when the high-octane fuel components are separated from the un-separated fuel at both set flow rates in the low vehicle speed condition and the engine idle condition to an almost liquid phase. Thus, in both the low vehicle speed condition and the engine idle condition, with the air cooling apparatus, the low-octane fuel can be made to pass through the heat exchanger as the second liquid.

BRIEF DESCRIPTION OF THE DRAWINGS

FIG. 1 is a schematic vertical sectional view showing a device for separating fuel components according to the present invention.

DESCRIPTION OF THE PREFERRED EMBODIMENT

FIG. 1 is a schematic vertical sectional view showing a device for separating fuel components according to the present invention. In FIG. 1, reference numeral 1 designates a station for separating fuel components comprising a first section 1b and a second section 1c which are divided by a separating membrane 1a permeating aromatic components. Un-separated fuel pressurized at a relative high pressure by a fuel pump 3 is supplied to the first section 1b from an un-separated fuel tank 2 for storing the un-separated fuel. Reference numeral 4 designates a regulator for regulating a flow rate of the un-separated fuel supplied to the first section 1b. Reference numeral 5 designates a heater for heating the pressurized un-separated fuel immediately before supplying to the first section 1b. The heater 5 utilizes, for example, the heat of the exhaust gas. However, the heater 5 may be an electric heater. Reference numeral 6 is a temperature sensor for measuring a fuel temperature heated by the heater 5 immediately upstream of the first section 1b.

The separating membrane 1a is selectively permeable to aromatic components in the fuel. Therefore, when pressure within the second section 1c is maintained at a relatively low pressure, aromatic components of the un-separated fuel in the first section 1b permeate the separating membrane 1a, and exude on the surface of the separating membrane 1a at the second section 1c side. In the present embodiment, a pressure within the second section 1c is maintained at a pressure lower than the saturated vapor pressure of the exuded aromatic components and thus the fuel exuded on the surface of the membrane can be vaporized continuously from the surface of the membrane. The vaporized fuel is sent to an air cooling apparatus 8 by a vacuum pump 7 and is cooled down in the air cooling apparatus 8 so as to change to an almost liquid phase.

On the other hand, low-octane fuel remaining when aromatic components permeate the separating membrane 1a has an octane number lower than that of the un-separated fuel. The low-octane fuel is a relative high temperature (for example, about 350 degrees K or 75 degrees C.) because the un-separated fuel is heated by the heater 5. Accordingly, when the low-octane fuel flows out from the station 1 which separates the fuel components, a part of the low-octane fuel becomes a gas phase. Thus, the low-octane fuel is in a mixed gas phase and liquid phase state and is sent to the air cooling apparatus 8 to be cooled down to an almost liquid phase in the air cooling apparatus 8.

The high-octane fuel consisting of aromatic components and the low-octane fuel remaining when a part of the high-octane fuel is separated are cooled down to the liquid phase in the air cooling apparatus 8. However, only the air cooling apparatus 8 cannot cools down the high-octane fuel and the low-octane fuel sufficiently to be stored in the high-octane fuel tank 10 and in the low-octane fuel tank 11.

Therefore, the high-octane fuel in the liquid phase and the low-octane fuel in the liquid phase are made to pass through the heat exchanger 9. On the other hand, the un-separated fuel between the regulator 4 and the heater 5, i.e., the un-separated fuel upstream of the heater 5 is also made to pass through the heat exchanger 9. Thus, heat exchange between the un-separated fuel passing through the heat exchanger 9 and the high-octane fuel passing through the heat exchanger 9 occurs and heat exchange between the un-separated fuel passing through the heat exchanger 9 and the low-octane fuel in the liquid phase passing through the heat exchanger 9 occurs. Therefore, the temperature of the un-separated fuel increases and the temperatures of the high-octane fuel and the low-octane fuel in the liquid phase decrease sufficiently such that they can be stored in the high-octane fuel tank 10 and in the low-octane fuel tank 11.

All of the above mentioned members are mounted on the vehicle. The air cooling apparatus 8 provides efficient cooling that is exposed to cooling wind when the vehicle on which the air cooling apparatus is mounted is moving. On the other hand, the air cooling apparatus 8 has heat radiation fins and can provide the cooling while the vehicle is stopped like in the engine idle condition and there is no cooling wind.

The high-octane fuel stored in the high-octane fuel tank 10 is sent to for example a delivery pipe, and is then injected from the delivery pipe via a fuel injector arranged in the intake port of each cylinder mainly in high engine load operations so as to be supplied to the cylinder from the intake port. On the other hand, the low-octane fuel stored in the low-octane fuel tank 11 is sent to, for example, another delivery pipe, and is then injected from this delivery pipe via a fuel injector arranged in each cylinder mainly in low engine load operations so as to be supplied to the cylinder directly.

Thus, in the engine having a high compression ratio, regular gasoline which has a lower price may be used. In low engine load operations in which knocking rarely occurs, the low-octane fuel separated from the regular gasoline can be mainly used via the fuel injector arranged in the cylinder. On the other hand, in the high engine load operations in which knocking readily occurs, the high-octane fuel separated from the regular gasoline can be mainly used via the fuel injector arranged in the intake port and therefore good operations without knocking can be realized.

In the present embodiment, the heat exchanger 9 realizes a heat exchange between the first liquid passing through it and the second liquid passing through it. A flow resistance of liquid phase is lower than that of the mixed state of gas phase and liquid phase and a heat transfer coefficient of liquid phase is higher than that of the mixed state of gas phase and liquid phase. Therefore, the heat exchanger 9 between a first liquid and a second liquid has a very high heat exchange efficiency and can sufficiently cool down the low-octane fuel and the high-octane fuel passing through it as the second liquid with heat exchange between the un-separated fuel passing through it as the first liquid and the second liquid even when the heat exchanger is small so as to be easily mounted on the vehicle.

The un-separated fuel is heated by the heat exchange in the heat exchanger 9. Accordingly, a flow rate of the un-separated fuel, which the current heating ability of the heater 5 can increase to the desired temperature (for example, 355 degrees K or 80 degrees C.), namely, the temperature at which aromatic components can be sufficiently separated by the separating membrane 1a, can be increased. The heater 5 utilizes the heat of exhaust gas and has a different heating ability in every engine operation. For example, heating ability in the engine idle operation is low because a flow rate of the exhaust gas is small and the temperature of the exhaust gas is low. On the other hand, the higher the engine load becomes, the larger the flow rate of the exhaust gas is and the higher the temperature of the exhaust gas is, the higher the heating ability becomes.

Thus, the temperature of the un-separated fuel heated by the heat exchanger 9 and the heater 5 is detected by the temperature sensor 6 and the flow rate of the un-separated fuel supplied to the first section 1b of the station 1 for separating fuel components is regulated by the regulator 4 such that the detected temperature becomes equal to or higher than the desired temperature. The higher the engine load becomes, the larger the amount of the high-octane fuel is consumed. Therefore, it is desirable that the higher the engine load becomes, the larger the flow rate of the un-separated fuel supplied to the first section 1b of the station 1 for separating fuel components is set.

Thus, because the un-separated fuel is heated at the temperature equal to or higher than the desired temperature at which the separating membrane can separate aromatic components sufficiently, the low-octane fuel remaining when aromatic components are separated is a relatively high temperature. Therefore, when the low-octane fuel flows out from the station 1 which separates the fuel components, a part of the low-octane fuel becomes a gas phase and the low-octane fuel becomes the mixed gas phase and liquid phase state. The low-octane fuel of the mixed state cannot be cooled down sufficiently by means of the small size heat exchanger 9. Therefore, according to the present embodiment, the air-cooling apparatus 8 cools down the low-octane fuel sufficiently to change to the liquid phase.

However, if the air cooling apparatus 8 does not cool down the low-octane fuel sufficiently to become the liquid phase, a pressure pump or the like may pressurize the low-octane fuel such that a part of the low-octane fuel does not become the gas phase and thus may send the low-octane fuel of liquid phase to the heat exchanger 9.

In the present embodiment, the high-octane fuel is collected from the second section 1c of the station 1 which separates the fuel components as vapor fuel and is cooled down in the air-cooling apparatus 8 sufficiently to change to the liquid phase. However, a pressure pump may be arranged downstream of the vacuum pump 7 and may pressurize the high-octane fuel sufficiently to change to the liquid phase. In addition, the high-octane fuel may be collected from the second section 1c of the station 1 for separating the fuel components as liquid fuel and may be supplied to the heat exchanger 9.

In the present embodiment, the air-cooling apparatus 8 does not only cool down the low-octane fuel but also the high-octane fuel simultaneously sufficiently to change to the liquid phase, and the heat exchanger 9 does not only cool down the low-octane fuel but also the high-octane fuel of liquid phase simultaneously. However, these maters are not limit to the present invention. The high-octane fuel may be cooled down by any cooling means, for example, by another cooling apparatus or another heat exchanger.

In addition, the number and the size of the heat radiation fins of the air-cooling apparatus 8 are selected such that the cooling ability of the air cooling apparatus 8 can sufficiently cool down the low-octane fuel remaining when a part of the high-octane fuel is separated from the un-separated fuel at the flow rate set in each of the engine idle condition without the cooling wind when the vehicle is moving and the low vehicle speed condition when the speed of the vehicle on which the device for separating the fuel components is mounted is lower than the predetermined speed and the cooling wind is weak sufficiently to change to the liquid phase. In addition, if the air-cooling apparatus 8 also cools down the high-octane fuel, the air cooling apparatus 8 is designed to also have a cooling ability which can cool down the high-octane fuel separated from the un-separated fuel at the flow rate set in each of the engine idle condition and the low vehicle speed condition when the speed of the vehicle is lower than the predetermined speed sufficiently to change to the liquid phase.

The invention claimed is:

1. A device for separating fuel components comprising:
   an un-separated fuel tank in which un-separated fuel is stored;
   a high-octane fuel tank in which high-octane fuel is stored, said high-octane fuel having an octane level greater than an octane level of said un-separated fuel;
   a low-octane fuel tank in which low-octane fuel is stored, said low-octane fuel having an octane level less than said octane level of said un-separated fuel and said octane level of said high-octane fuel;
   a separation chamber having a separating membrane that separates the separation chamber into a first section and a second section, said separating membrane separates said un-separated fuel in said first section into said high-octane fuel in said second section, said low-octane fuel remains in said first section after said high-octane fuel is separated from said un-separated fuel;
   an un-separated fuel pathway in which said un-separated fuel flows from said un-separated fuel tank to said first section of said separation chamber;
   a high-octane fuel pathway in which said high-octane fuel flows from said second section of said separation chamber to said high-octane fuel tank;
   a low-octane fuel pathway in which said low-octane fuel flows from said first section of said separation chamber to said low-octane fuel tank;
   a heat exchanger positioned between said un-separated fuel tank, said high-octane fuel tank and said low-octane fuel tank and said separation chamber such that said un-separated fuel pathway, said high-octane fuel pathway and said low-octane fuel pathway pass through said heat exchanger, said heat exchanger exchanges heat from said low-octane fuel in a liquid state to said un-separated fuel in a liquid state prior to said un-separated fuel being supplied to said first section of said separation chamber; and
   a cooling apparatus through which said high-octane fuel pathway and said low-octane pathway extend through, said cooling apparatus being positioned between said separation chamber and said heat exchanger, said cooling apparatus cooling said low-octane fuel to an almost liquid state prior to said low-octane fuel entering said heat exchanger.

2. The device for separating fuel components according to claim 1, wherein said cooling apparatus is an air cooling apparatus for cooling down said low-octane fuel to change a gas phase part of said low-octane fuel to said almost liquid phase.

3. The device for separating fuel components according to claim 2, wherein in a low vehicle speed condition when a speed of the vehicle on which said device is mounted is lower than a predetermined speed, said un-separated fuel at a set flow rate larger than a set flow rate in an engine idle condition is supplied to said separating membrane to separate said high-octane fuel, and said air cooling apparatus has a cooling ability which can change a gas phase part of said low-octane fuel remaining when said high-octane fuel are separated from said un-separated fuel at both said set flow rates in said low vehicle speed condition and in said engine idle condition to an almost liquid phase.

4. The device for separating fuel components according to claim 1, wherein said heat exchanger exchanges heat from said high-octane fuel and said low-octane fuel to said un-separated fuel prior to said un-separated fuel being supplied to said first section of said separation.

5. The device for separating fuel components according to claim 1, wherein said cooling apparatus cooling said high-octane fuel to an almost liquid state prior to said low-octane fuel entering said heat exchanger.

* * * * *